Feb. 24, 1970  R. J. GUGIN  3,497,051
SWATHER
Filed Dec. 4, 1967  3 Sheets-Sheet 1
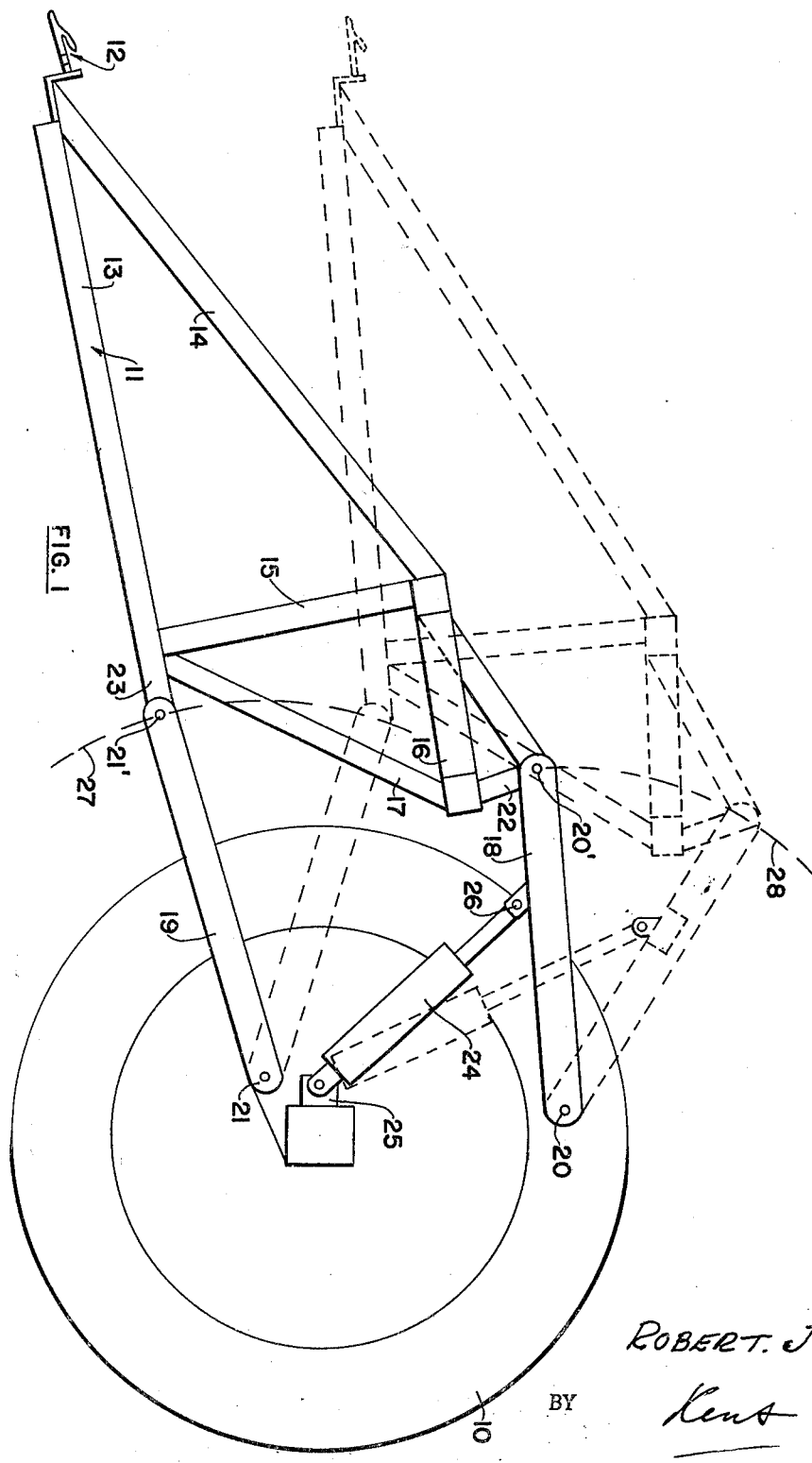
INVENTOR
ROBERT J. GUGIN
BY
ATTORNEY Feb. 24, 1970   R. J. GUGIN   3,497,051
SWATHER
Filed Dec. 4, 1967   3 Sheets-Sheet 2

INVENTOR
ROBERT J. GUGIN
BY
ATTORNEY

United States Patent Office 3,497,051
Patented Feb. 24, 1970

3,497,051
SWATHER
Robert J. Gugin, Minnedosa, Manitoba, Canada, assignor to Agristeel Limited, North Minnedosa, Manitoba, Canada
Filed Dec. 4, 1967, Ser. No. 687,795
Claims priority, application Great Britain, Dec. 5, 1966, 54,284/66
Int. Cl. B65g 65/02
U.S. Cl. 198—7
1 Claim

ABSTRACT OF THE DISCLOSURE

This invention relates to draper assemblies for use with self-propelled swathers, pull type swathers, or any other farm implement in which a swath is picked up and moved from one position to be deposited in a windrow in another position. It consists of a movable draper assembly end shiftable to provide either a left-hand discharge or a right-hand discharge and includes means automatically to reverse the direction of travel of the draper canvas in such a way that the upper run thereof is always being pulled or is in tension.

---

This invention relates to new and useful improvements in swathers, particularly self-propelled swathers although some of the improvements can, of course, be utilized with pull-type swathers or any type of agricultural device which uses a swath type canvas in conjunction with a cutting knife and reel assembly.

One of the advantages flowing from the use of my invention in swathers is the adjustability of the knife and cable components with relation to the ground.

Normally, such knife and cable components, together with the reel, are pivoted from a fixed point so that the raising and lowering of the knife assembly, etc., causes the knife assembly to travel in an arc. In other words, the higher the setting the more parallel to the ground is the swathing table.

I have found it advantageous to maintain the angle of attack of the swathing table to the ground at a relatively constant rate and by mouning my device upon the chassis, with a pantograph form of mounting, I avoid the disadvantages of each covnentional type of mounting.

Another advantage of my invention is the provision of novel means whereby the swath can be deposited upon either side of the machine.

This is normally accomplished merely by reversing the canvas and permitting the swath to be dumped from one end or the other of said canvas.

However, there is little flexibility with such an arrangement and in the present device, I end-shift the canvas table assembly from one end to the other of the framework. This means that the swath to be laid side by side for pick up by the combine or, alternatively, may be laid separately depending upon the needs of the operator.

A further advantage flowing from the previous advantage is the automatic reversing mechanism for the drive of my table canvas thus permitting the top run of the canvas to be under tension at all times in contrast to the conventional reversing mechanism which either pulls on the upper run of the canvas or upon the lower run of the canvas.

A further object of the invention is that the rear panel or shields travel with the table thus opening and closing the discharge at each end of the cross chassis and permitting the swath to be deposited rearwardly upon one side or the other of the machine without any danger of undesirable deposition from the closed end.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregoing herein particularly exemplified in one or more specific embodiments of such concept, reference being had to the accompanying figures in which:

FIGURE 1 is a side schematic view showing the mounting of the knife and swath table framework.

In the drawings like characters of reference indicate corresponding parts in the different figures.

Figure 9:
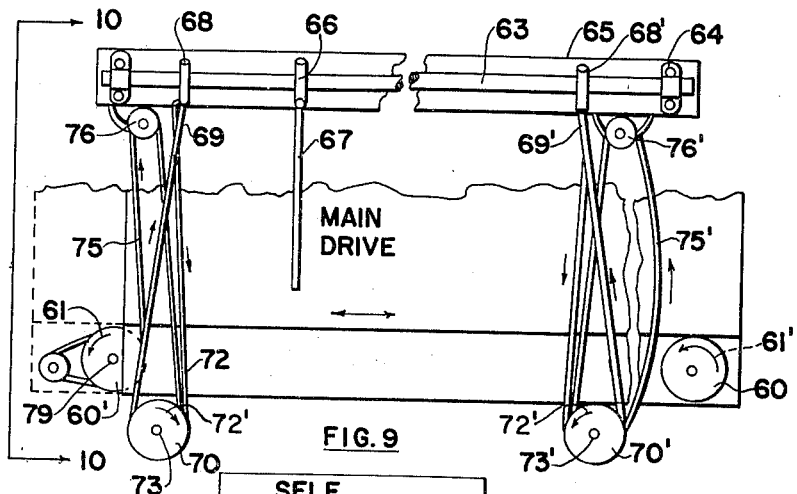
FIGURE 9 is a similar to FIGURE 6 but showing the preferred embodiment of my invention.

Proceeding therefore to describe my invention in detail, it will be appreciated that these views shown in the attached drawings are mainly schematic to show the operating principals of the device.

The present device is presumed to be a self-propelled swather, but it will be appreciated that many of the improvements can be used on pull-type swathers or the like.

Reference character 10 in FIGURE 1 illustrates one wheel of the self-propelled swather, the self-propelled portion being assumed to be on the right hand side of the drawings.

The swath table is collectively designated 11 and the knife drive assembly on the lower end of the table is collectively designed 12.

Items 13, 14 and 15 are frame members providing the rigid support for the swath table assembly and members 16 and 17 connected to either 14 or 15 extend rearwardly for bracing purposes and for mounting the swath table for the aforementioned pivotal movement.

A pair of links 18 and 19 are pivoted by one end 20 and 21 thereof to supporting framework on the self-propelled portion (not illustrated). The other ends 20' and 21' are pivotally connected to the bracing framework 16 and 17 respectively, it being understood that upwardly extending portions 22 are provided from member 16 to form a pivot mounting 20' and that a rear extension 23 provided on member 13 to provide a mounting point for the end 21'.

An hydraulic piston and cylinder assembly 24 extends between mounting point 25 and to a pivot point 26 midway between the ends of link 18.

This forms a pantograph arrangement so that extension of the piston and cylinder assembly 24 causes the table assembly together with knife and reel (not illustrated) to move upwardly to take up the position shown in phantom in FIGURE 1, maintaining approximately the same angle of relationship between the table and the ground due to the different radius of action of the pivot points 20' and 21' as indicated by the dotted lines 27 and 28.

The table or draper assembly 11 is adapted to be end-shiftable transversely within the supporting framework 13 and 14 and within the transverse angle irons 29 extending therebetween. This shows one method of mounting the table assembly and is illustrative only.

A base plate 30 together with a back plate 31 are situated at right angles to one another and mounted upon rollers 32 engageable within the angle irons 29 so that this right angle assembly may be run freely along the angle irons.

Alternatively, the rollers may be eliminated, there being sufficient power to move the assembly 11 along the angle iron members 29.

The table or draper 11 is mounted upon this right angle component and consists of a pair of rollers 32' (one only of which is shown) each of said rollers being situated at each end of the base 30.

A conventional canvas 31' extends around these rollers and is provided with slats 33 in the usual manner.

Figure 2:
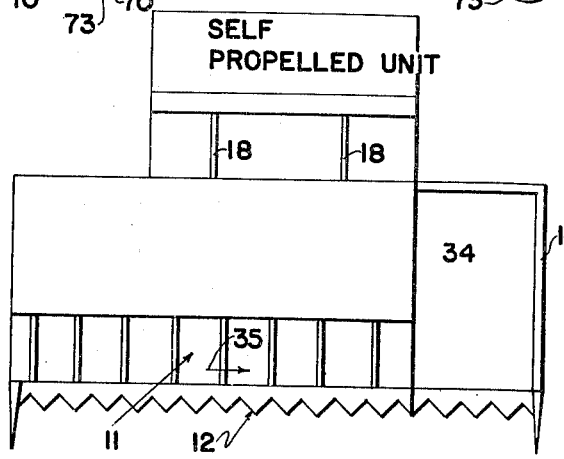
FIGURE 2 is a schematic plan view showing the swath canvas and table assembly in the position to deposit a swath upon the left side of the machine.
Figure 3:
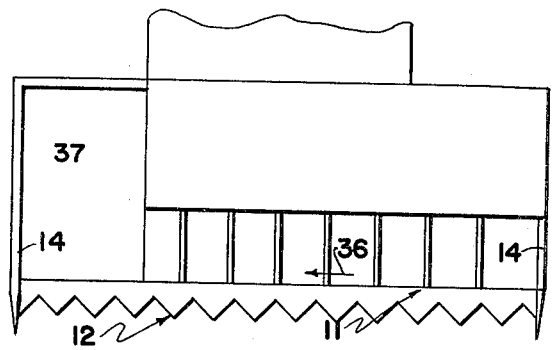
FIGURE 3 is a view similar to FIGURE 2 but showing the swath table in position to deposit a swath on the right side of the machine.

The back plate 31, the base 30 and the table rollers and canvas can all be moved from the position shown in FIGURE 2, to the position shown in FIGURE 3.

It will be observed when in the position shown in FIG. 2, a discharge area 34 is left within the supporting framework, so that if the canvas is moving in the direction of arrow 35, grain swaths will be deposited within the discharge area 34 and upon the left hand side of the machine.

If, however, the table assembly is end shifted to the position shown in FIGURE 3, and the canvas rotated in the direction of arrow 36, then a discharge area 37 is left upon the right hand side of the machine so that grain swaths deposited by the canvas within the discharge area is upon the right hand side of the machine.

Figure 6:
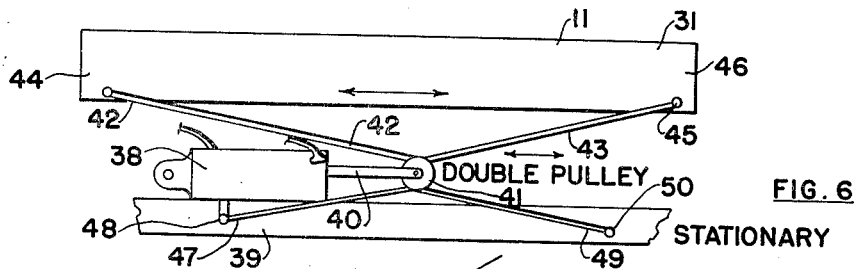
FIGURE 6 is a fragmentary schematic view showing one method of end-shifting the swath table assembly.

Reference to FIGURE 6 shows one method of end shifting the table assembly from position 2 to position 3 and vice-versa. It consists of an hydraulic piston and cylinder assembly 38 mounted upon stationary member 39. The piston rod 40 extending from the cylinder, is provided with a double grooved pulley 41 upon the end thereof and cables 42 and 43 extend around this double pulley. One end of cable 42 is anchored adjacent one end 44 of the movable table assembly (preferably adjacent back plate 31) and the other end 45 of the cable 43 is anchored adjacent the other end 46 of the movable assembly.

End 47 of cable 42 is anchored to the fixed structure 39 as at 48 and the end 49 of cable 43 is anchored to the stationary structure as at 50.

It will therefore be apparent that if the piston rod 40 is moved, for example, rightwardly with respect to FIGURE 6, the structure 11 will also move rightwardly and the cables 42 and 43 will, of course, remain under tension without slack appearing. By reversing the movement of piston rod 40, the structure 11 will move leftwardly, once again the cables remaining under tension thus providing a relatively simple and yet positive method for end-shifting the table assembly, from left to right and vice-versa.

Figure 7:
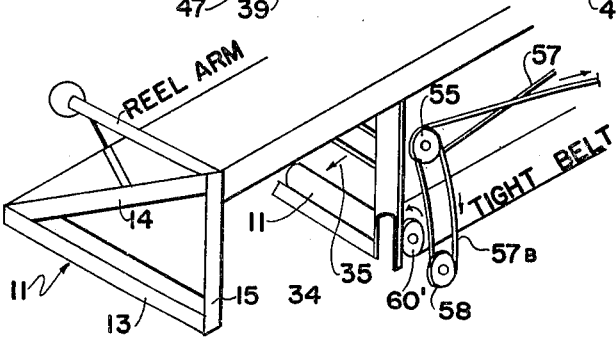
FIGURE 7 is a fragmentary isometric view from the rear of the swath table assembly with the swath table assembly in the position shown in FIGURE 2.
Figure 8:
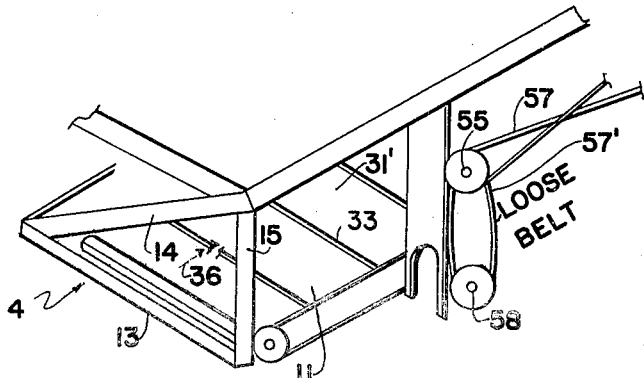
FIGURE 8 is a view similar to FIGURE 7 but with the swath table assembly in the position as shown in FIGURE 3.

FIGURES 7 and 8 represent a rear fragmentary isometric view of the discharge area 34 and it will be observed that when this discharge area is closed off so that the discharge area 37 is opened, the back panel 31 closes off the vertical opening associated with the discharge area 34 so that the grain cannot be spilled inadvertently through this opening.

As hereinbefore described, it is desirable to reverse the rotation of the canvas automatically when the table assembly is end-shifted from left to right and vice-versa.

Figure 5:
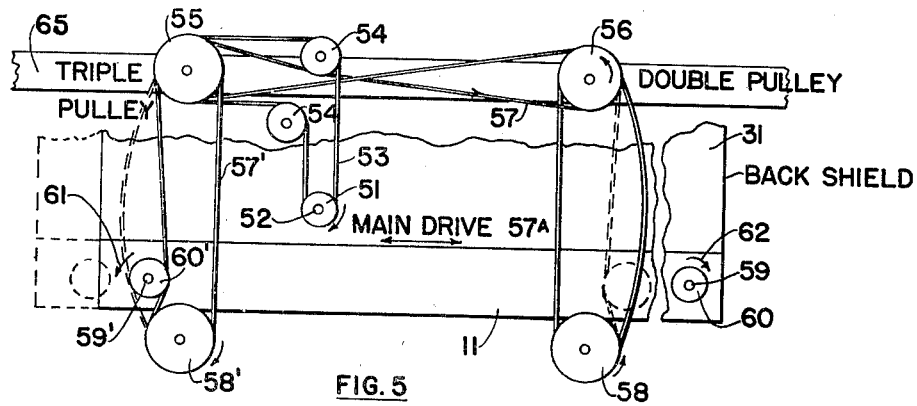
FIGURE 5 is a schematic view of the automatic reversing mechanism for the swath canvas together with the drive belts and pulleys.

Reference to FIGURE 5 shows the schematic diagram of the automatic reversing mechanism together with the drive mechanism for the table assembly.

Pulley 51 is secured to shaft 52 which in turn is connected operatively to the source of power (not illustrated) and acts as a main drive.

A belt 53 extends around pulley 51, around idler pulley 54 and around one groove of a triple pulley 55, all of which are mounted upon stationary structure.

A double pulley 56 is mounted to one side of pulley 55 and a cross belt 57 extends around another groove of the triple pulley 55 and one of the grooves of the double pulley 56 thus giving opposite rotation to these two pulleys as indicated by arrows placed thereon.

A relatively loose belt 57A extends around the other groove of pulley 56 and around a spring loaded idler pulley 58 situated therebelow.

A similar belt 57' extends around the third groove of the triple pulley 55 and around a spring loaded idler pulley 58' similar to the aforementioned idler pulley 58, belt 57' also being slack or loose.

Idler pulleys 58 and 58' are also mounted on stationary structure.

Figure 4:
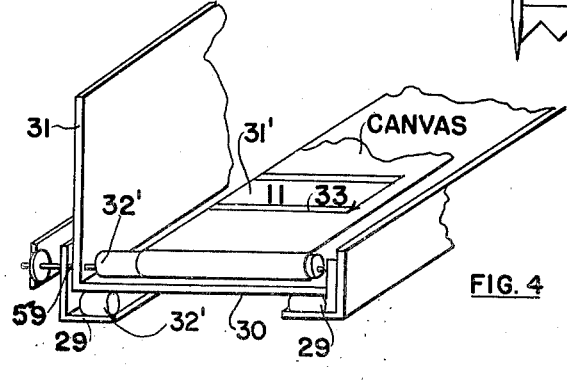
FIGURE 4 is a fragmentary isometric view showing the mounting of the swath table for the endwise shifting movement thereof.

Referring back to the table assembly, each of the rollers 32 are provided with spindles 59 (see FIGURE 4) which extend through the back plate 31 and in FIGURE 5 the spindles are designed as 59 and 59'.

Pulleys 60 and 60' are secured to these spindles and are in alignment with the aforementioned loose belts 57 and 57'.

When the table assembly 11 is mover to the right with respect to FIGURE 5 as illustrated by the solid line portion thereof, pulley 60' engages one side of belt 57' and tightens same causing this belt to transmit rotation to pulley 60' in the direction of arrow 35 (reference FIGURES 2, 4 and 7) it being understood that belt 57A remains slack at this time. It will be observed that the upper run of the canvas 31 is being pulled rather than pushed which is desirable.

When the table assembly is end-shifted to the position shown in phantom in FIGURE 5 (corresponding to the position shown in FIGURES 3 and 8), pulley 60' disengages belt 57' which becomes slack and pulley 60 engages belt 57 as shown in phantom thus causing belt 57 to transmit drive to pulley 60 in the direction of arrow 62. This causes the upper run of canvas to move in the direction of arrow 36 (FIGURES 3 and 8). Once again the upper run of the canvas is being pulled rather than pushed thus maintaining the taut condition thereof.

It will be seen that the drive is automatically reversed as the table assembly is end-shifted from one side to the other and that the upper run of the canvas is maintained in a pulled or taut condition at all times.

It will also be appreciated that this reversing mechanism can be applied to any table canvas or draper in which it is desirable to reverse the direction of movement automatically.

Figure 10:
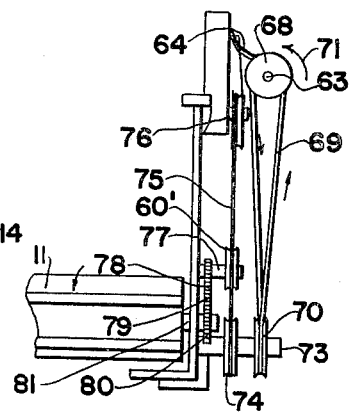
FIGURE 10 is a side view of FIGURE 9.

FIGURES 9 and 10 show the preferred embodiment of the reversing mechanism.

In this mechanism, I utilize a drive shaft 63 mounted within pillow blocks 64, to stationary supporting structure 65.

A pulley 66 is secured to this drive shaft and is connected to the main source of power (not illustrated) by means of belt 67.

Driver pulleys 68 and 68' are also secured to the drive shaft 63 in spaced apart relationship and belts 69 and 69' extend around these driver pulleys and around idler pulleys 70 and 70' situated below the driver pulleys 68 and 68' respectively and secured to stationary supporting structure (not illustrated).

It will be observed that pulleys 70 and 70' are situated at right angles to pulleys 68 and 68' so that belts 69 cross as illustrated. The drive shaft 63 rotates in the direction of arrow 71 (FIGURE 10) so that, when in the position shown in FIGURE 9, pulley 70 rotates in the direction of arrow 72'.

Pulley 70 is mounted upon shaft 73 which also carries a further pulley 74 around which belt 75 extends, belt 75 also passing around a spring loaded idler pulley 76 situated adjacent the supporting structure 63. Belt 75 is normally slack but when the draper assembly is moved rightwardly with reference to FIGURE 9, the draper roller drive pulley 60' engages the upper-surface of belt 75, tightening same against the spring loader idler 76 thus enabling belt 75 to impart rotation to pulley 60' in the direction of arrow 61.

The assembly at the opposite end of FIGURE 9 works in exactly the same way when the table is end-shifted leftwardly with reference to FIGURE 9 and corresponding parts have been given primed numbers.

In the embodiment shown in FIGURES 9 and 10, the draper roller drive pulleys 60 and 60' are mounted upon shafts 77 which also carry sprocket wheels 78 around which chains 79 extend, said chains also extending around further sprockets 80 secured to the main shaft 81 mounting the draper rollers 32.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. In a swather assembly which includes a source of power and supporting structure for a draper assembly; said draper assembly comprising in combination a pair of canvas supporting rollers, a frame mounting said rollers in spaced and parallel relationship, a draper canvas engaging around said rollers, means to end-shift said draper assembly from a right hand discharge position to a left hand discharge position and vice versa, and drive means operatively connecting said source of power to said draper assembly for moving said canvas around said rollers, said drive means including means automatically transferring said drive means to the effective discharge end of said draper canvas, said drive means operatively connecting said source of power to said draper assembly including a pair of spaced apart driver pulleys mounted to said supporting structure, said source of power being operatively connected to said driver pulleys, a pair of idler pulleys also mounted on said supporting structure one each below each of said driver pulleys, a draper roller drive pulley mounted at each end of said draper assembly, each of said draper roller drive pulleys being operatively connected to a corresponding draper roller, one of said draper roller drive pulleys engaging one of said belts when said draper assembly is at one end of the travel thereof, the other of said draper roller drive pulleys engaging the other of said belts when said draper assembly is at the other end of the travel thereof, said means to end-shift said draper assembly including a fluid operated piston and cylinder assembly, a double sheave on the distal end of the piston rod of said piston and cylinder assembly, a cable secured by one end thereof to adjacent one end of said draper assembly, said cable extending around one of said sheaves and back towards said one end, said cable being secured to a stationary anchor by the other end thereof and substantially below said one end, a further cable secured by one end thereof to adjacent the other end of said draper assembly, said cable extending around the other of said sheaves and back towards said other end, said cable being secured to a stationary anchor by the other end thereof and below said one end of said further cable.

References Cited
UNITED STATES PATENTS

| | | | |
|---|---|---|---|
| 315,687 | 4/1885 | Whiting | 74—220 |
| 1,406,933 | 2/1922 | Cohn | 74—221 |
| 3,343,347 | 9/1967 | Burrough | 56—181 |

RICHARD E. AEGERTER, Primary Examiner

U.S. Cl. X.R.

56—181